US012530975B2

(12) United States Patent
Peng et al.

(10) Patent No.: US 12,530,975 B2
(45) Date of Patent: Jan. 20, 2026

(54) UNCREWED AERIAL VEHICLE CONTROL METHOD, APPARATUS, AND SYSTEM

(71) Applicant: Huawei Technologies Co., Ltd., Shenzhen (CN)

(72) Inventors: Wenjie Peng, Shanghai (CN); Mingzeng Dai, Shenzhen (CN); Rui Wang, Shanghai (CN); Xiaoli Shi, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 289 days.

(21) Appl. No.: 17/855,311

(22) Filed: Jun. 30, 2022

(65) Prior Publication Data

US 2022/0348325 A1 Nov. 3, 2022

Related U.S. Application Data

(63) Continuation of application No. PCT/CN2019/130386, filed on Dec. 31, 2019.

(51) Int. Cl.
*G08G 5/25* (2025.01)
*G08G 5/34* (2025.01)
(Continued)

(52) U.S. Cl.
CPC ................ *G08G 5/25* (2025.01); *G08G 5/34* (2025.01); *G08G 5/55* (2025.01); *G08G 5/57* (2025.01);
(Continued)

(58) Field of Classification Search
CPC ........... B64U 2201/00; B64U 2201/10; G08G 5/0008; G08G 5/0039; G08G 5/0069; G08G 5/0013; G08G 5/0043; G08G 5/0052; G08G 5/045; G05D 1/1064; H04W 4/44; H04W 4/46
(Continued)

(56) References Cited

U.S. PATENT DOCUMENTS

2012/0242505 A1* 9/2012 Maeda ............ G08G 1/096783 340/905
2017/0235316 A1 8/2017 Shattil
(Continued)

FOREIGN PATENT DOCUMENTS

CN 105676856 A 6/2016
CN 106598066 A 4/2017
(Continued)

OTHER PUBLICATIONS

"3rd Generation Partnership Project; Technical Specification Group Services and System Aspects; Remote Identification of Unmanned Aerial Systems; Stage 1 (Release 16)," 3GPP TR 22.8de V1.0.0, pp. 1-23, 3rd Generation Partnership Project, Valbonne, France (May 2018).

*Primary Examiner* — James M McPherson
*Assistant Examiner* — Sean Patrick Reidy
(74) *Attorney, Agent, or Firm* — Leydig, Voit & Mayer, Ltd.

(57) ABSTRACT

An uncrewed aerial vehicle control method, an apparatus, and a system are provided. An uncrewed aerial vehicle or a network device identifies a risk of a flight path, to manage the flight path of the uncrewed aerial vehicle, thereby ensuring flight safety of the uncrewed aerial vehicle.

20 Claims, 6 Drawing Sheets

(51) Int. Cl.
*G08G 5/55* (2025.01)
*G08G 5/57* (2025.01)

(52) U.S. Cl.
CPC ...... *B64U 2201/00* (2023.01); *B64U 2201/10* (2023.01)

(58) Field of Classification Search
USPC .............................................................. 701/3
See application file for complete search history.

(56) References Cited

U.S. PATENT DOCUMENTS

| | | | | |
|---|---|---|---|---|
| 2019/0051193 | A1 | 2/2019 | Gutierrez et al. | |
| 2019/0238658 | A1* | 8/2019 | Shimizu | H04W 4/46 |
| 2019/0364402 | A1* | 11/2019 | Lee | H04W 4/40 |
| 2021/0146922 | A1* | 5/2021 | Fuchs | G08G 1/096791 |
| 2021/0197966 | A1* | 7/2021 | Zhang | G08G 5/0008 |
| 2021/0241634 | A1* | 8/2021 | Sarim | G08G 5/0013 |

FOREIGN PATENT DOCUMENTS

| | | | |
|---|---|---|---|
| CN | 107180561 | A | 9/2017 |
| CN | 108351652 | A | 7/2018 |
| CN | 108445903 | A | 8/2018 |
| CN | 109859533 | A | 6/2019 |
| KR | 20190104013 | A | 9/2019 |
| WO | 2019030425 | A1 | 2/2019 |
| WO | 2019099343 | A1 | 5/2019 |

* cited by examiner

UNCREWED AERIAL VEHICLE CONTROL METHOD, APPARATUS, AND SYSTEM

CROSS-REFERENCE TO RELATED APPLICATIONS

This application is a continuation of International Application No. PCT/CN2019/130386, filed on Dec. 31, 2019, the disclosure of which is hereby incorporated by reference in its entirety.

TECHNICAL FIELD

Embodiments of this application relate to the communication field, and in particular, to an uncrewed aerial vehicle control method, an apparatus, and a system.

BACKGROUND

Application of an uncrewed aerial vehicle (UAV) is increasingly popular in modem society, and management of similar uncrewed aerial vehicles gradually attracts attention of people.

Currently, the UAV may send information about a flight path to a radio access network (RAN) node, so that the RAN node can optimize a handover policy of the UAV. FIG. 1 is a schematic diagram of information about a possible UAV flight path.

As the UAVs become increasingly popular, a large quantity of UAVs may appear in an area. Generally, a flight path of a UAV may be set by a user without applying for authorization. This may cause a problem of a conflict between flight paths of UAVs, as shown in FIG. 2. Consequently, the UAVs collide, causing a potential safety hazard. Alternatively, some UAVs may fly into a no-fly area, causing unnecessary trouble or bringing unnecessary economic losses.

SUMMARY

In view of this, embodiments of this application provide an uncrewed aerial vehicle control method, an apparatus, and a system, to appropriately control a flight path of an uncrewed aerial vehicle.

According to a first aspect, an embodiment of this application provides an uncrewed aerial vehicle control method. The method may be implemented by an uncrewed aerial vehicle or a component that may be configured in the uncrewed aerial vehicle. The method may include: a first uncrewed aerial vehicle receives information about a flight path from at least one other uncrewed aerial vehicle (a second uncrewed aerial vehicle); the first uncrewed aerial vehicle determines, based on information about a flight path of the first uncrewed aerial vehicle and the received information about the flight path, that there is a collision risk; and the first uncrewed aerial vehicle updates the flight path of the first uncrewed aerial vehicle.

Optionally, the information about the flight path received from the second uncrewed aerial vehicle may include information about a flight path of the second uncrewed aerial vehicle, or may include information about a flight path that is of another uncrewed aerial vehicle and that is obtained by the second uncrewed aerial vehicle.

In some possible implementations, the first uncrewed aerial vehicle may receive the information about the flight path through a sidelink. Optionally, when the information about the flight path is received through the sidelink, a layer 2 identifier may be further received. The layer 2 identifier is a destination identifier.

In some possible implementations, after determining that there is the collision risk, the first uncrewed aerial vehicle may actively update the current flight path. Optionally, after actively updating the flight path, the first uncrewed aerial vehicle may report information related to an updated flight path. For example, the first uncrewed aerial vehicle may send the information related to the updated flight path to an access network device, an uncrewed aerial vehicle controller associated with the first uncrewed aerial vehicle, or an uncrewed aerial system traffic management (UTM) node.

In some possible implementations, after determining that there is the collision risk, the first uncrewed aerial vehicle may report collision risk information and then update the flight path based on a received indication or instruction. For example, the first uncrewed aerial vehicle may report, to the UTM node by using an alarm (for example, sending a collision alarm message or indicating the collision risk information in a message), that there is the collision risk. After learning that there is the collision risk, the UTM node may indicate or instruct the first uncrewed aerial vehicle to update the path. Alternatively, after learning that there is the collision risk, the UTM node may send an alarm indication to an uncrewed aerial vehicle controller, so that the uncrewed aerial vehicle controller controls the updating of the flight path. For another example, the first uncrewed aerial vehicle may send the first uncrewed aerial vehicle to an access network device or the uncrewed aerial vehicle controller by using an alarm, so that the access network device or the uncrewed aerial vehicle controller implements updating of the flight path.

Optionally, alarm information sent by the first uncrewed aerial vehicle may include one or more of a cause value and an alarm location/area.

Optionally, indication information for updating the flight path sent by the UTM node, the access network device, or the uncrewed aerial vehicle controller to the first uncrewed aerial vehicle may include one or more of the following: updated flight path information and adjustment information of the flight path. The adjustment information of the flight path may include location adjustment information and/or time adjustment information for the alarm location/area.

According to a second aspect, an embodiment of this application further provides an uncrewed aerial vehicle control method. The method may be implemented by a control node (a UTM node, an access network device, or an uncrewed aerial vehicle controller) of an uncrewed aerial vehicle, or may be implemented by a component configured in the control node of the uncrewed aerial vehicle. In some possible implementations, the method may include: receiving collision risk information reported by a first uncrewed aerial vehicle; and sending flight path update information to the first uncrewed aerial vehicle based on the collision risk information, or instructing the first uncrewed aerial vehicle to update a flight path. In other words, the control node may indicate or instruct the first uncrewed aerial vehicle to update the flight path when there is a collision risk. Optionally, the flight path update information may include adjustment information of the flight path or information about an updated flight path.

Based on the uncrewed aerial vehicle control method provided in the first aspect or the second aspect, after detecting the collision risk, the uncrewed aerial vehicle updates the flight path of the uncrewed aerial vehicle, to avoid a collision and ensure flight safety. Further, the control node (for example, the UTM node, the access network device, or the uncrewed aerial vehicle controller) of the uncrewed aerial vehicle controls and manages the flight path, to perform centralized management on flight paths of all uncrewed aerial vehicles, thereby improving management efficiency and appropriateness.

According to a third aspect, an embodiment of this application further provides an uncrewed aerial vehicle control method. The method may be implemented by a network device (a UTM node or an access network device), or may be implemented by a component configured in the network device. The method may include: receiving information about a first flight path of an uncrewed aerial vehicle; and determining, based on the information about the first flight path, whether the first flight path of the uncrewed aerial vehicle has a problem, where the determining whether the first flight path of the uncrewed aerial vehicle has a problem includes: determining whether there is a collision risk between the first flight path and another device, and/or determining whether the first flight path is legal.

Optionally, an association between a first uncrewed aerial vehicle and an uncrewed aerial vehicle controller corresponding to the first uncrewed aerial vehicle may be implemented by the network device.

In some possible implementations, the network device may receive the information about the first flight path from the uncrewed aerial vehicle or an uncrewed aerial vehicle controller.

In some possible implementations, if the information about the first flight path is sent by the uncrewed aerial vehicle controller to the network device, and the network device determines that the first flight path has no problem, the network device sends the first flight path to the first uncrewed aerial vehicle, so that the first uncrewed aerial vehicle flies along the first flight path.

In some possible implementations, the method may further include: When determining that the first flight path has the problem, the network device sends a message used to reject the first flight path.

In some possible implementations, the message used to reject the first flight path may include at least one of the following: a cause value, flight path update information, or time point and/or location information at which there is the problem in the first flight path.

In some possible implementations, the network device may determine the flight path update information for the first uncrewed aerial vehicle based on information such as a size and/or a model of the first uncrewed aerial vehicle.

Optionally, when the network device is the UTM node, the message used to reject the first flight path may be sent to the first uncrewed aerial vehicle, or may be sent to the uncrewed aerial vehicle controller corresponding to the first uncrewed aerial vehicle, so that the first uncrewed aerial vehicle can fly along an updated flight path.

Optionally, when the network device is the access network device, the message used to reject the first flight path may be sent to the UTM node, may be sent to the first uncrewed aerial vehicle, or may be sent to the uncrewed aerial vehicle controller corresponding to the first uncrewed aerial vehicle, so that the first uncrewed aerial vehicle can fly along an updated flight path.

According to a fourth aspect, an embodiment of this application further provides an uncrewed aerial vehicle control method. The method may be implemented by a first uncrewed aerial vehicle, an uncrewed aerial vehicle controller corresponding to the first uncrewed aerial vehicle, or a UTM node, or may be implemented by components that can be separately configured in these devices. The method may include: receiving a message used to reject a flight path of the first uncrewed aerial vehicle, and updating the flight path based on the message.

In some possible implementations, the message used to reject a first flight path may include at least one of the following: a cause value, flight path update information, or time point and/or location information at which there is a problem in the first flight path.

Based on the method provided in the third aspect or the fourth aspect, a network device identifies the flight path, and is further used to manage the flight path, so that flight safety and legality can be ensured.

According to a fifth aspect, a communication apparatus is provided. The communication apparatus includes a module, a unit, or a component configured to implement the uncrewed aerial vehicle control method in the first aspect.

According to a sixth aspect, a communication apparatus is provided. The communication apparatus includes a module, a unit, or a component configured to implement the uncrewed aerial vehicle control method in the second aspect.

According to a seventh aspect, a communication apparatus is provided. The communication apparatus includes a module, a unit, or a component configured to implement the uncrewed aerial vehicle control method in the third aspect.

According to an eighth aspect, a communication apparatus is provided. The communication apparatus includes a module, a unit, or a component configured to implement the uncrewed aerial vehicle control method in the fourth aspect.

According to a ninth aspect, a computer-readable storage medium is provided. The computer-readable storage medium stores a computer program. When the computer program is executed by a communication apparatus, the communication apparatus is enabled to implement the method according to any one of the first aspect and the possible implementations of the first aspect, the communication apparatus is enabled to implement the method according to any one of the second aspect and the possible implementations of the second aspect, the communication apparatus is enabled to implement the method according to any one of the third aspect and the possible implementations of the third aspect, or the communication apparatus is enabled to implement the method according to any one of the fourth aspect or the possible implementations of the fourth aspect.

According to a tenth aspect, a computer program product including instructions is provided. When the instructions are executed, the method according to any one of the first aspect and the possible implementations of the first aspect is implemented, the method according to any one of the second aspect and the possible implementations of the second aspect is implemented, the method according to any one of the third aspect and the possible implementations of the third aspect is implemented, or the method according to any one of the fourth aspect and the possible implementations of the fourth aspect is implemented.

According to an eleventh aspect, a communication system is provided. The communication system includes an uncrewed aerial vehicle and an uncrewed aerial vehicle controller. Optionally, the communication system may further include a UTM node and/or an access network device. Alternatively, the communication system may include an uncrewed aerial vehicle and a UTM node. Optionally, the communication system may further include an uncrewed aerial vehicle controller and/or an access network device. It may be understood that, for interaction between network elements or devices in the communication system, refer to the method described in any one of the first to the fourth aspects.

DESCRIPTION OF EMBODIMENTS

Figure 1:
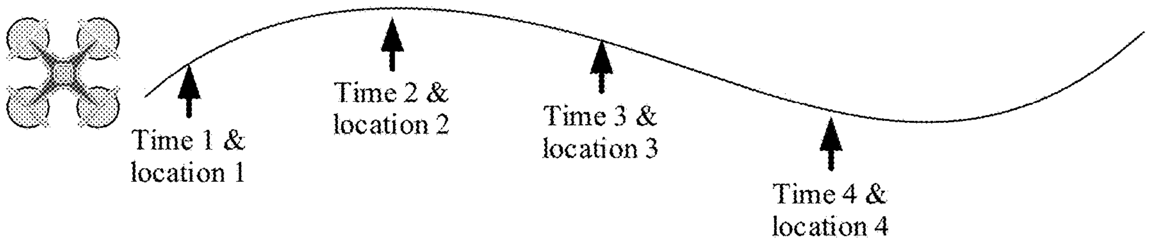
FIG. 1 is a schematic diagram of a UAV flight path.
Figure 2:
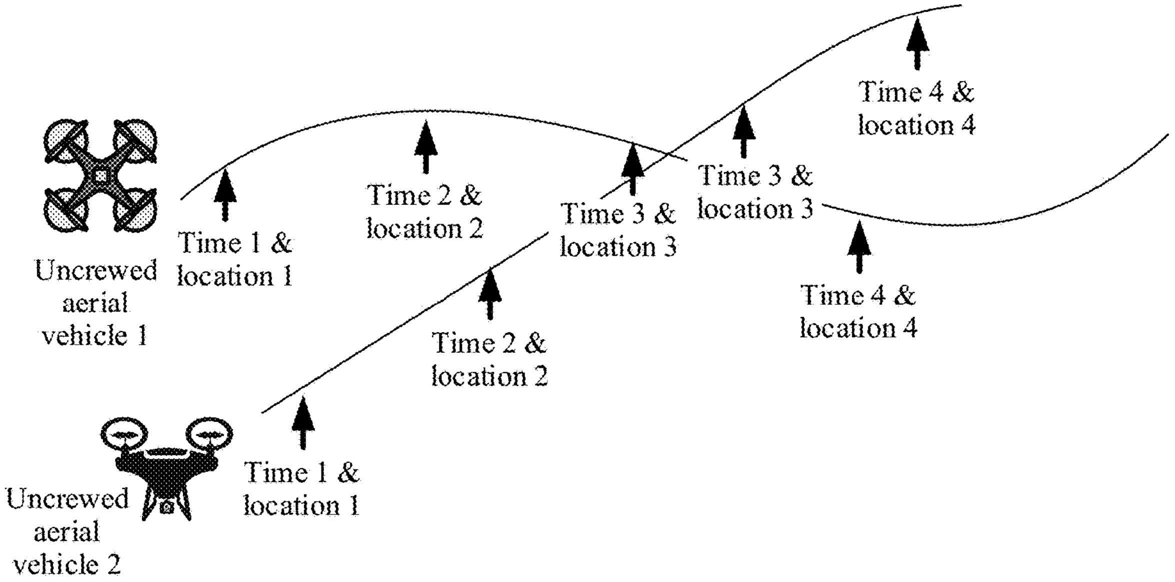
FIG. 2 is a schematic diagram of a conflict between UAV flight paths.

The following describes technical solutions of this application with reference to the accompanying drawings.

The technical solutions in embodiments of this application may be applied to various communication systems, for example, a long term evolution (LTE) system, an LTE frequency division duplex (FDD) system, an LTE time division duplex (TDD) system, a universal mobile telecommunication system (UMTS), a worldwide interoperability for microwave access (WiMAX) communication system, a 5th generation (5G) system, new radio (NR), or a future network. The 5G mobile communication system described in this application includes a non-standalone (NSA) 5G mobile communication system or a standalone (SA) 5G mobile communication system. The technical solutions provided in this application may be further applied to a future communication system, for example, a 6th generation mobile communication system. Alternatively, the communication system may be a public land mobile network (PLMN), a device-to-device (D2D) communication system, a machine to machine (M2M) communication system, an internet of things (IoT) communication system, or another communication system.

In embodiments of this application, an access network device may be any communication device that has a wireless transceiver function and that is used to communicate with a terminal device. The device includes but is not limited to an evolved NodeB (eNB), a radio network controller (RNC), a NodeB (NB), a base station controller (BSC), a base transceiver station (BTS), a home base station (HeNB or a home NodeB, HNB), a baseband unit (BBU), an access point (AP) in a wireless fidelity (Wi-Fi) system, a wireless relay node, a wireless backhaul node, a transmission point (TP), a transmission reception point (TRP), or the like. The device may alternatively be a gNB or a transmission point (a TRP or a TP) in a 5G system such as an NR system, or may be one antenna panel or a group of antenna panels (including a plurality of antenna panels) of a base station in a 5G system, or may be a network node that constitutes a gNB or a transmission point, for example, a baseband unit (BBU), or a distributed unit (DU). The access network device in embodiments of this application may also be referred to as a radio access network (RAN) device or a RAN node.

In some deployments, the access network device in embodiments of this application may be a central unit (CU), a distributed unit (DU). Alternatively, the access network device includes a CU and a DU. The gNB may further include an active antenna unit (AAU). The CU implements some functions of the gNB, and the DU implements some functions of the gNB. For example, the CU is responsible for processing a non-real-time protocol and a service, to implement functions of a radio resource control (RRC) layer and a packet data convergence protocol (PDCP) layer. The DU is responsible for processing a physical layer protocol and a real-time service, to implement functions of a radio link control (RLC) layer, a media access control (MAC) layer, and a physical (PHY) layer. The AAU implements some physical layer processing functions, radio frequency processing, and a function related to an active antenna. Information at the RRC layer is eventually converted into information at the PHY layer, or is converted from information at the PHY layer. Therefore, in this architecture, higher layer signaling such as RRC layer signaling may also be considered as being sent by the DU, or being sent by the DU and the AAU. It may be understood that the access network device may be a device including one or more of a CU node, a DU node, and an AAU node.

Further, the CU may be divided into a control plane central unit (CU-CP) and a user plane central unit (CU-UP). The CU-CP and the CU-UP may also be deployed on different physical devices. The CU-CP is responsible for a control plane function, and mainly includes the RRC layer and a PDCP-C layer. The PDCP-C layer is mainly responsible for data encryption and decryption, integrity protection, data transmission, and the like on the control plane. The CU-UP is responsible for a user plane function, and mainly includes an SDAP layer and a PDCP-U layer. The SDAP layer is mainly responsible for processing data of a core network and mapping a flow to a bearer. The PDCP-U layer is mainly responsible for at least one of functions such as encryption and decryption, integrity protection, header compression, serial number maintenance, and data transmission on a data plane. Specifically, the CU-CP is connected to the CU-UP through a communication interface (for example, an E1 interface). The CU-CP indicates that the access network device is connected to a core network device through a communication interface (for example, an Ng interface), and is connected to the DU through a communication interface (for example, an F1-C (control plane) interface). The CU-UP is connected to the DU through a communication interface (for example, an F1-U (user plane) interface).

In another possible implementation, the PDCP-C layer is also included in the CU-UP.

It may be understood that the foregoing protocol layer division between the CU and the DU, and protocol layer division between the CU-CP and the CU-UP are merely examples, and there may be another division manner. This is not limited in embodiments of this application.

The access network device mentioned in embodiments of this application may be a device including a CU or a DU, or a device including a CU and a DU, or a device including a control plane CU node (a CU-CP node), a user plane CU node (a CU-UP node), and a DU node.

The access network device may be deployed on land, including indoor or outdoor and handheld or vehicle-mounted devices, or may be deployed on a water surface, or may be deployed on an airplane, a balloon and a satellite in the air. A scenario in which the access network device is located is not limited in embodiments of this application.

Currently, it is discussed in a standard that a network element for managing uncrewed aerial vehicle traffic is introduced on a network side. The network element may be referred to as, for example, an uncrewed aerial system traffic management (UTM) node. In a possible implementation, the network element may be a core network element (for example, a function entity disposed in a core network) or an independent control network element. For example, a network model after the network element is introduced may be shown in FIG. 3. The UTM node may also be referred to as a UTM module, a UTM network element, a UTM entity, or the like.

Figure 3:
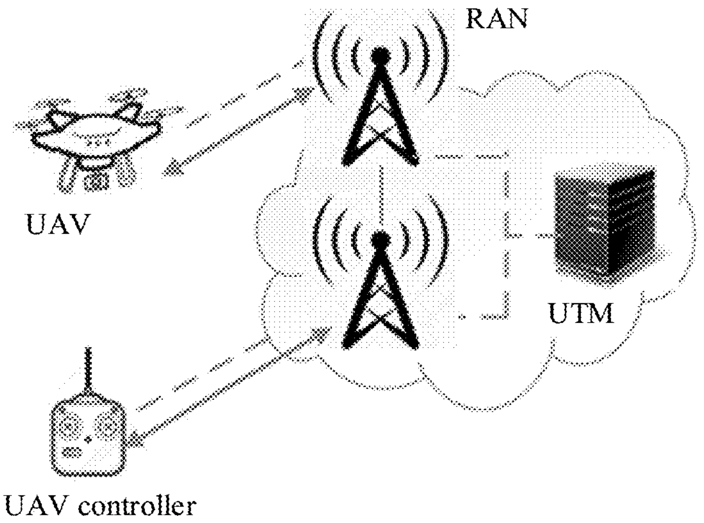
FIG. 3 is a schematic diagram of a UAV communication system according to an embodiment of this application.

The system shown in FIG. 3 includes a UAV, a UAV controller, an access network device, and a UTM node. The UAV controller is configured to control the UAV. For example, an operator may control a flight path and/or a flight speed of the UAV by using the UAV controller. The UTM node may associate the UAV with the UAV controller, to implement a control and management function of the UAV or the UAV controller. The access network device may provide a mobile communication network service for the UAV and the UAV controller. Optionally, the access network device may also be associated with the UAV and the UAV controller, to implement the control and management function of the UAV or the UAV controller. In FIG. 3, one UAV is used as an example for description. It may be understood that the system may include one or more UAVs and corresponding UAV controllers. In the system, one UAV may correspond to one UAV controller, or a plurality of UAVs may correspond to one UAV controller. This is not limited in this embodiment of this application.

Figure 4:
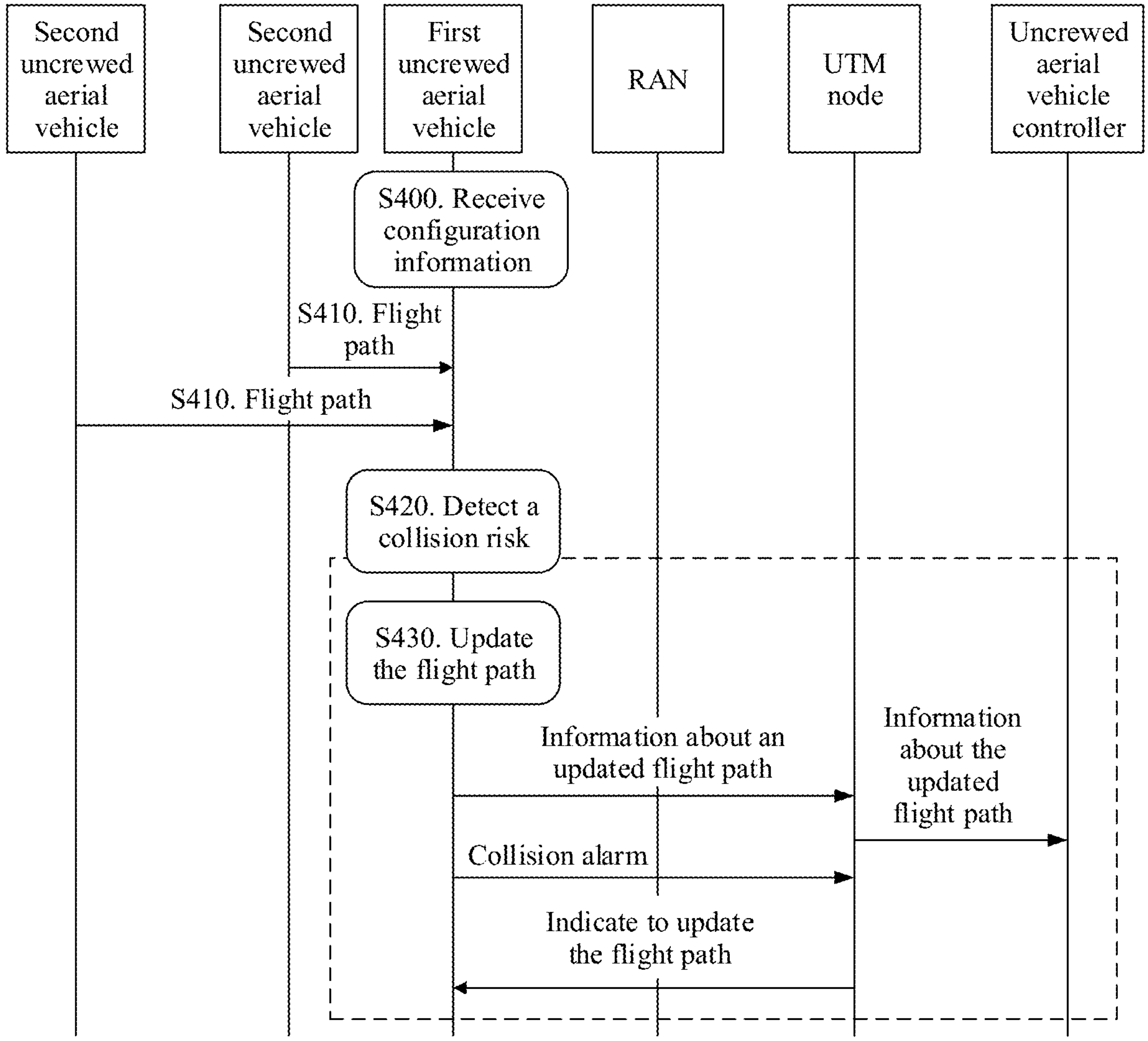
FIG. 4 is a schematic diagram of an uncrewed aerial vehicle control method according to an embodiment of this application.

When there are the plurality of uncrewed aerial vehicles in the system, to avoid a possible collision between the uncrewed aerial vehicles, an embodiment of this application provides an uncrewed aerial vehicle control method. As shown in FIG. 4, the method includes the following steps.

S410. A first uncrewed aerial vehicle receives information about a flight path from a second uncrewed aerial vehicle.

It should be noted that, in embodiments of this application, an uncrewed aerial vehicle is a generalized concept, and an uncrewed aerial vehicle or a flight terminal operated by a controller may be collectively referred to as the uncrewed aerial vehicle. The second uncrewed aerial vehicle may include one or more uncrewed aerial vehicles different from the first uncrewed aerial vehicle. The uncrewed aerial vehicle may also be referred to as airborne user equipment (Airborne UE).

The flight path represents a path or a flight point of the uncrewed aerial vehicle. The information about the flight path may include location information and time information corresponding to the location information. The location information may be represented by using a longitude, a latitude, and an altitude. Alternatively, the location information may be geographical location information, for example, XX Street, Pudong District, Shanghai. The height in this embodiment of this application may be a height relative to the ground, a height relative to a sea level (an altitude), or a height relative to a reference point (a relative height). This is not limited in this application. It may be understood that the location information may alternatively be represented by using other information. For example, the location information is represented by using reference coordinates, provided that a location of the uncrewed aerial vehicle can be determined. This is not limited in this embodiment of this application.

An uncrewed aerial vehicle (which may also be referred to as an uncrewed aerial vehicle A) may send information about a flight path to another uncrewed aerial vehicle (at least one uncrewed aerial vehicle different from the uncrewed aerial vehicle A), so that the another uncrewed aerial vehicle can learn of the information about the corresponding flight path from the uncrewed aerial vehicle A. The information about the flight path sent by the uncrewed aerial vehicle A may include information about a flight path of the uncrewed aerial vehicle A, or may include information about a flight path of the another uncrewed aerial vehicle that is received by the uncrewed aerial vehicle A. That is, the uncrewed aerial vehicle A may send, to the another uncrewed aerial vehicle, all or a part of the information about the flight path that can be learned of by the uncrewed aerial vehicle A. It may be understood that each uncrewed aerial vehicle that needs to send information about a flight path in the system may send the information about the flight path to another uncrewed aerial vehicle by using a similar method. That each uncrewed aerial vehicle in the system needs to send the information about the flight path to the another uncrewed aerial vehicle is not limited in this embodiment of this application. In other words, all uncrewed aerial vehicles each may send the information about the flight path to the another uncrewed aerial vehicle, or some uncrewed aerial vehicles each may send the information about the flight path to the another uncrewed aerial vehicle.

Optionally, for example, the uncrewed aerial vehicle A may send the information about the flight path in a broadcast manner through a sidelink (SL), and the another uncrewed aerial vehicle may receive the information about the flight path through the sidelink. The sidelink is an example of a link for communication between the uncrewed aerial vehicles. This embodiment of this application is not limited thereto. The sidelink may also be referred to as a sidelink, a D2D link, a V2X link, or the like. In addition, the uncrewed aerial vehicle A may alternatively send the information about the flight path in a multicast or unicast manner. In this embodiment of this application, a message carrying the information about the flight path may be referred to as a first message. The first message may include a first identifier, and the identifier is a destination identifier and is used to identify a function or a purpose of the information about the flight path included in the first message. In other words, the uncrewed aerial vehicle that receives the information about the flight path may know, by using the first identifier, what information is received. Optionally, the first identifier may be, for example, a layer 2 (L2) identifier. Optionally, the information about the flight path and the first identifier may be carried in the first message after specific processing, or the first message may carry other information.

Optionally, the second uncrewed aerial vehicle may alternatively send information about the uncrewed aerial vehicle corresponding to the information about the flight path to the first uncrewed aerial vehicle. The information about the uncrewed aerial vehicle herein may include, for example, an identifier of the uncrewed aerial vehicle, and may further include information about a model and/or a size of the uncrewed aerial vehicle.

S420. The first uncrewed aerial vehicle determines, based on information about a flight path of the first uncrewed aerial vehicle and the information about the flight path received from the second uncrewed aerial vehicle, whether there is a collision risk with the another uncrewed aerial vehicle.

In this step, after receiving the information about the flight path of the another uncrewed aerial vehicle, the first uncrewed aerial vehicle determines, based on the flight path of the first uncrewed aerial vehicle, whether there is the collision risk with the another uncrewed aerial vehicle. In other words, the first uncrewed aerial vehicle performs collision risk detection. The another uncrewed aerial vehicle herein may be the second uncrewed aerial vehicle, or may be an uncrewed aerial vehicle corresponding to a flight path indicated by the second uncrewed aerial vehicle.

In a possible implementation, the flight path of the first uncrewed aerial vehicle may be determined based on one or more of the following conditions, whether there is the collision risk with the another uncrewed aerial vehicle: (1) A location of the flight path of the first uncrewed aerial vehicle overlaps a location of the flight path of the another uncrewed aerial vehicle at a same moment. (2) A spacing between a location of the flight path of the first uncrewed aerial vehicle and a location of the flight path of the another uncrewed aerial vehicle at a same moment is less than or equal to a first threshold. (3) The flight path of the first uncrewed aerial vehicle and the flight path of the another uncrewed aerial vehicle appear at a same location at two close moments. (4) A spacing between a corresponding location of the flight path of the first uncrewed aerial vehicle and a corresponding location of the flight path of the another uncrewed aerial vehicle at two close moments is less than or equal to a second threshold.

Optionally, the flight path of the first uncrewed aerial vehicle may be determined by using the condition (1), whether there is the collision risk with the another uncrewed aerial vehicle. In other words, when the location of the first uncrewed aerial vehicle overlaps the location of the another uncrewed aerial vehicle at the same moment, it is determined that the first uncrewed aerial vehicle is to collide with the another uncrewed aerial vehicle. That is, there is the collision risk. When the condition (1) is not met, it may be determined that there is no collision risk between the first uncrewed aerial vehicle and the another uncrewed aerial vehicle.

Optionally, the condition (1) and any one or more of the conditions (2) to (4) may be combined to determine the flight path of the first uncrewed aerial vehicle, whether there is the collision risk with the another uncrewed aerial vehicle. In other words, provided that any one of combined conditions is met, it is determined that the first uncrewed aerial vehicle is to collide with the another uncrewed aerial vehicle. That is, there is the collision risk. For example, when the conditions (1) and (2) are combined, if the location of the flight path of the first uncrewed aerial vehicle overlaps the location of the flight path of the another uncrewed aerial vehicle at the same moment, and/or the spacing between the location of the flight path of the first uncrewed aerial vehicle and the location of the flight path of the another uncrewed aerial vehicle at the same moment is less than or equal to the first threshold, it is determined that the first uncrewed aerial vehicle is to collide with the another uncrewed aerial vehicle. When none of the combined conditions is met, it may be determined that there is no collision risk between the first uncrewed aerial vehicle and the another uncrewed aerial vehicle. In this embodiment of this application, a corresponding location in the foregoing conditions (1) to (4) may be referred to as an alarm location or a risk location. Alternatively, an area within a specific range around the corresponding location in the foregoing conditions (1) to (4) may be referred to as an alarm area or a risk area.

The foregoing conditions (1) to (4) may be specified (for example, specified in a protocol) or set in advance, may be set by an uncrewed aerial vehicle controller or the uncrewed aerial vehicle, or may be configured by a network device.

When it is determined that the first uncrewed aerial vehicle is to collide with the another uncrewed aerial vehicle, S430 may be performed. When it is determined that there is no collision risk between the first uncrewed aerial vehicle and the another uncrewed aerial vehicle, the first uncrewed aerial vehicle may continue the current flight path without performing other processing.

The first threshold may be the same as or different from the second threshold. The two close moments may mean that an absolute value of a difference between the two moments is less than or equal to a third threshold. It may be understood that values and units of the first threshold, the second threshold, and the third threshold are not limited in this embodiment of this application. For example, the first threshold may be 10 cm, the second threshold may be 15 cm, and the third threshold may be 1 min. In addition, the first threshold, the second threshold, and the third threshold may be flexibly set, or may be preset fixed values.

In a case of flexible setting, the threshold may be set by the uncrewed aerial vehicle, may be configured by the uncrewed aerial vehicle controller, may be configured by an access network device, or may be configured by a UTM node. When the first threshold and the second threshold are the same, the two thresholds may not be configured, but one threshold is configured. That is, the two thresholds are reused. In a possible implementation manner, the threshold may be set or configured based on the size and/or the model of the uncrewed aerial vehicle. For example, for an uncrewed aerial vehicle with a large size, the threshold may be set to a large value, to avoid collision as much as possible.

In this case, optionally, this embodiment of this application may further include the following step.

S400. The first uncrewed aerial vehicle receives configuration information, where the configuration information includes at least one of the following: the first threshold, the second threshold, or the third threshold.

In a possible implementation, the first uncrewed aerial vehicle may receive the configuration information from the uncrewed aerial vehicle controller.

In another possible implementation, the first uncrewed aerial vehicle may receive the configuration information from the access network device, and the access network device may send the configuration information to the first uncrewed aerial vehicle in a broadcast, multicast, or unicast manner. A message used to send the configuration information to the first uncrewed aerial vehicle is not limited in this embodiment of this application.

In still another possible implementation, the first uncrewed aerial vehicle may receive the configuration information from a UTM node. For example, the UTM node may include the configuration information in such as non-access stratum (NAS) message or application data, and the access network device transparently transmits the configuration information to the first uncrewed aerial vehicle. A message used to send the configuration information to the first uncrewed aerial vehicle is not limited in this embodiment of this application.

Optionally, S400 may be performed before S410 or S420.

Further, when it is determined that the first uncrewed aerial vehicle is to collide with the another uncrewed aerial vehicle, optionally, the method in this embodiment of this application may further include the following step.

S430. The first uncrewed aerial vehicle updates the flight path of the first uncrewed aerial vehicle.

The first uncrewed aerial vehicle may perform avoidance after determining that there is the collision risk. In other words, the first uncrewed aerial vehicle adjusts the current flight path.

In a possible implementation manner, the first uncrewed aerial vehicle may actively update the current flight path. In other words, the first uncrewed aerial vehicle updates the flight path by itself. Further, after actively updating the flight path, the first uncrewed aerial vehicle may report information related to an updated flight path. For example, the first uncrewed aerial vehicle may send the information related to the updated flight path to the access network device, or an uncrewed aerial vehicle controller associated with the first uncrewed aerial vehicle. Optionally, after receiving the information related to the updated flight path, the access network device may further send the information to the UTM node, or the UTM node may notify the uncrewed aerial vehicle controller associated with the first uncrewed aerial vehicle of the information related to the updated flight path. Alternatively, after receiving the information related to the updated flight path, the uncrewed aerial vehicle controller may report the information to the UTM node. A manner and a channel (link) in which the first uncrewed aerial vehicle reports the information related to the updated flight path are not limited in this embodiment of this application. The first uncrewed aerial vehicle reports the information related to the updated flight path, so that a device or a node that performs management and control on the first uncrewed aerial vehicle can learn of the related information, thereby improving subsequent management and control efficiency.

For example, the first uncrewed aerial vehicle may update the flight path in the following manner: The first uncrewed aerial vehicle redesigns a complete flight path. Alternatively, the first uncrewed aerial vehicle adjusts an alarm location or an alarm area based on the current flight path. For example, the first uncrewed aerial vehicle moves upward/downward/left/right by a specific distance. Alternatively, the first uncrewed aerial vehicle adjusts a time point corresponding to the alarm location or the alarm area based on the current flight path. For example, the first uncrewed aerial vehicle may continue to fly after staying at a non-alarm location or a non-alarm area for a specific time period. Alternatively, the first uncrewed aerial vehicle may adjust a flight speed of the first uncrewed aerial vehicle. In other words, a time point corresponding to a flight location on the flight path is changed. The foregoing redesigned flight path or location information or time information for adjusting the alarm location (or the alarm area) may be collectively referred to as the information related to the updated flight path. Location adjustment information or the time information for the alarm location/area may be referred to as adjustment information of the flight path.

In another possible implementation manner, the first uncrewed aerial vehicle may report collision risk information after determining that there is the collision risk. A network element that receives a collision risk information report may indicate the first uncrewed aerial vehicle to update the flight path. For example, the network element sends flight path update information (which may be information about an updated flight path, or may be adjustment information of the flight path) to the first uncrewed aerial vehicle, so that the first uncrewed aerial vehicle updates a current path. Alternatively, for example, the network element may instruct the first uncrewed aerial vehicle to update the flight path. After receiving an instruction, the first uncrewed aerial vehicle updates the flight path in a manner similar to the foregoing manner of actively updating the current flight path.

That the first uncrewed aerial vehicle reports the collision risk information may be as follows: The first uncrewed aerial vehicle may report, to the UTM node by using an alarm (for example, sending a collision alarm message or indicating the collision risk information in a message), that there is the collision risk. After learning that there is the collision risk, the UTM node may indicate the first uncrewed aerial vehicle to update the path. For example, the UTM node sends first indication information to indicate the first uncrewed aerial vehicle to update the path. The first indication information may be sent to the first uncrewed aerial vehicle by using the access network device, or may be sent to the first uncrewed aerial vehicle by using an uncrewed aerial vehicle controller associated with the first uncrewed aerial vehicle.

Alternatively, that the first uncrewed aerial vehicle reports the collision risk information may be as follows: The first uncrewed aerial vehicle may report, to the UTM node by using an alarm (for example, sending a collision alarm message or indicating the collision risk information in a message), that there is the collision risk. The UTM node may send the alarm to an uncrewed aerial vehicle controller associated with the first uncrewed aerial vehicle, so that the uncrewed aerial vehicle controller may indicate the first uncrewed aerial vehicle to update the path. For example, the uncrewed aerial vehicle controller sends second indication information to indicate the first uncrewed aerial vehicle to update the path.

Alternatively, that the first uncrewed aerial vehicle reports the collision risk information may be as follows: The first uncrewed aerial vehicle may report, to the access network device or a corresponding uncrewed aerial vehicle controller by using an alarm (for example, sending a collision alarm message or indicating the collision risk information in a message), that there is the collision risk. After learning that there is the collision risk, the access network device or the uncrewed aerial vehicle controller may indicate the first uncrewed aerial vehicle to update the path. For example, the access network device may send third indication information to the first uncrewed aerial vehicle or an uncrewed aerial vehicle controller associated with the first uncrewed aerial vehicle, to indicate the first uncrewed aerial vehicle to update the path.

The first uncrewed aerial vehicle reports the collision risk information, and the collision risk information may include a cause value (for example, a collision) and/or an alarm location, or may include a cause value (for example, a collision) and/or an alarm area. Based on the report, a corresponding network element can learn of alarm information, so that the flight path can be appropriately updated. The UTM node, the access network device, or the uncrewed aerial vehicle controller may be used as a control node of the uncrewed aerial vehicle.

Based on the uncrewed aerial vehicle control method provided in this embodiment of this application, after detecting the collision risk, the uncrewed aerial vehicle updates the flight path of the uncrewed aerial vehicle, to avoid a collision and ensure flight safety. Further, the control node of the uncrewed aerial vehicle controls and manages the flight path, to perform centralized management on flight paths of all uncrewed aerial vehicles, thereby improving management efficiency and appropriateness.

Another embodiment of this application further provides an uncrewed aerial vehicle control method. The method is applicable to a scenario in which there is one or more uncrewed aerial vehicles in a system. In the method, a network device receives information about a flight path of an uncrewed aerial vehicle, and determines, based on the received information about the flight path of the uncrewed aerial vehicle, whether the flight path of the uncrewed aerial vehicle has a problem, for example, determines whether the flight path of the uncrewed aerial vehicle has a collision risk with another device and/or whether the flight path of the uncrewed aerial vehicle is legal. In this way, the flight path of the uncrewed aerial vehicle is managed or controlled, to ensure flight safety. The network device may be a UTM node or an access network device. In the following embodiments, a scenario in which the network device is the UTM node or the access network device is separately described in detail.

Figure 5:
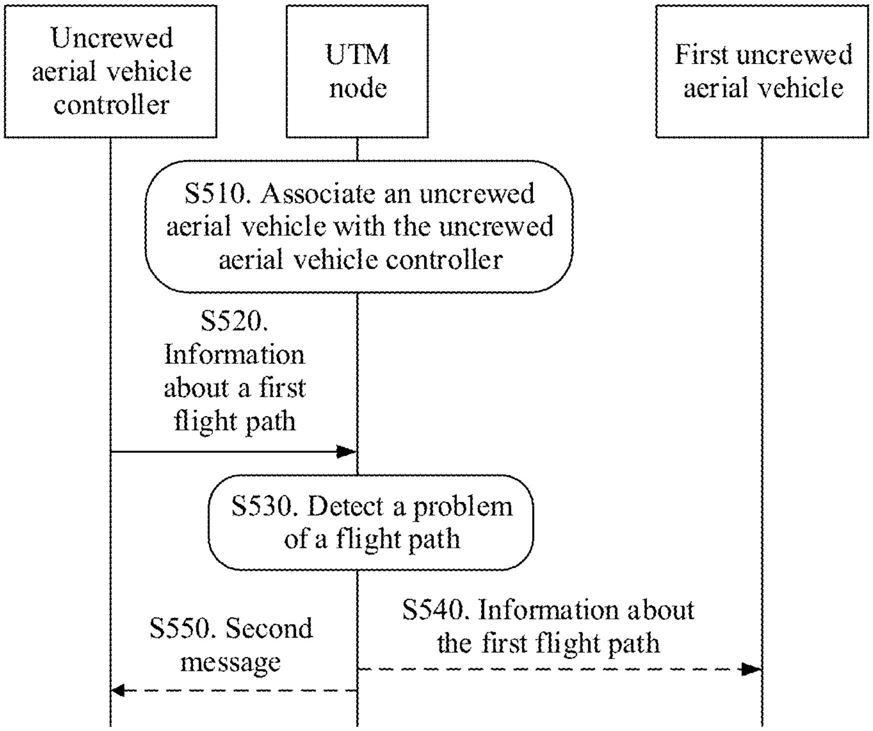
FIG. 5 is a schematic diagram of an uncrewed aerial vehicle control method according to another embodiment of this application.

As shown in FIG. 5, an embodiment of this application provides an uncrewed aerial vehicle control method, including the following steps.

S510. A UTM node associates an uncrewed aerial vehicle controller with an uncrewed aerial vehicle controlled by the uncrewed aerial vehicle controller.

The uncrewed aerial vehicle controller that controls a first uncrewed aerial vehicle may also be referred to as an uncrewed aerial vehicle controller corresponding to the first uncrewed aerial vehicle.

For example, the UTM node may separately receive registration information from the first uncrewed aerial vehicle and the uncrewed aerial vehicle controller (a first uncrewed aerial vehicle controller) corresponding to the first uncrewed aerial vehicle, so that the UTM node can learn, based on the registration information of the first uncrewed aerial vehicle and the registration information of the uncrewed aerial vehicle controller, of the uncrewed aerial vehicle controller that controls the first uncrewed aerial vehicle, thereby associating the first uncrewed aerial vehicle and the uncrewed aerial vehicle controller. Optionally, a correspondence between the uncrewed aerial vehicle and the uncrewed aerial vehicle controller may be maintained at the UTM node. For example, the correspondence is maintained in a form of a table, a list, or an index. It may be understood that S510 may also be referred to as that the UTM node learns of an association relationship between the uncrewed aerial vehicle controller and the uncrewed aerial vehicle.

The registration information sent by the first uncrewed aerial vehicle to the UTM node may include an identifier of the first uncrewed aerial vehicle. Further, an identifier of the uncrewed aerial vehicle controller corresponding to the first uncrewed aerial vehicle may be optionally included. Optionally, at least one of the following information may be further included: function information of the first uncrewed aerial vehicle, a model of the first uncrewed aerial vehicle, and size information of the first uncrewed aerial vehicle. A function of the first uncrewed aerial vehicle may be, for example, a V2X uncrewed aerial vehicle.

The registration information sent by the uncrewed aerial vehicle controller corresponding to the first uncrewed aerial vehicle to the UTM node may include identification information of the uncrewed aerial vehicle controller. Optionally, the registration information may further include identification information of one or more uncrewed aerial vehicles controlled by the uncrewed aerial vehicle controller. In addition, the registration information may include at least one of the following information: function information of the one or more uncrewed aerial vehicles controlled by the uncrewed aerial vehicle controller, models of the one or more uncrewed aerial vehicles controlled by the uncrewed aerial vehicle controller, and size information of the one or more uncrewed aerial vehicles controlled by the uncrewed aerial vehicle controller.

It should be noted that S510 is an optional step, that is, S510 may be skipped.

S520. The UTM node receives information about a first flight path of the first uncrewed aerial vehicle from the uncrewed aerial vehicle controller corresponding to the first uncrewed aerial vehicle.

The uncrewed aerial vehicle controller corresponding to the first uncrewed aerial vehicle may formulate a flight path for the first uncrewed aerial vehicle, and send information about the formulated flight path to the UTM node. One UTM node may receive information that is about a flight path of at least one uncrewed aerial vehicle and that is sent by at least one uncrewed aerial vehicle controller.

After receiving the information about the first flight path, the UTM node determines that the first flight path is formulated for the first uncrewed aerial vehicle, and performs S530.

S530. The UTM node determines whether the first flight path has a problem.

Optionally, the UTM node may determine, based on the association relationship learned of in S510, that the first flight path is formulated for the first uncrewed aerial vehicle. Alternatively, the UTM node may learn, based on an identifier, an index, or other indication information in the information about the first flight path, that the first flight path is formulated for the first uncrewed aerial vehicle.

That the UTM node determines whether the first flight path has a problem, that is, that the UTM node identifies whether the first flight path is feasible or the UTM node detects a flight path problem, may include: The UTM node determines whether the first flight path has a collision risk with another device and/or whether the flight path is legal.

The another device may include another uncrewed aerial vehicle or another device that may appear on the flight path, for example, a base station or a tower. In other words, the device herein may include infrastructure. A manner of determining whether there is a collision risk in the flight path between uncrewed aerial vehicles may be similar to a manner of determining whether there is a collision risk in a flight path of an uncrewed aerial vehicle in the embodiment shown in FIG. 4. A manner and a principle of determining whether there is a collision risk with the infrastructure are also similar to those in the foregoing descriptions. For example, when one or both of the following conditions are met, it may be considered that there is a collision risk between the flight path of the first uncrewed aerial vehicle and the infrastructure: (a) A location on the flight path of the first uncrewed aerial vehicle overlaps a location of the infrastructure. (b) A spacing between a location on the flight path of the first uncrewed aerial vehicle and a location of the infrastructure is small. For example, the spacing is less than or equal to a fourth threshold. A value of the fourth threshold is not limited in this embodiment of this application. In addition, the fourth threshold may be flexibly set, or may be a preset fixed value. In a case of flexible setting, the fourth threshold may be set by the uncrewed aerial vehicle, may be configured by the uncrewed aerial vehicle controller, may be configured by an access network device, or may be configured by the UTM node. Optionally, the fourth threshold may be set or configured based on a size and/or a model of the first uncrewed aerial vehicle. In addition, the foregoing conditions (a) and (b) may be specified or set in advance, may be set by the uncrewed aerial vehicle controller or the uncrewed aerial vehicle, or may be configured by a network device.

In addition, when there is a no-fly area (for example, a military area or another controlled area) on the flight path of the first uncrewed aerial vehicle, it may be considered that the flight path of the first uncrewed aerial vehicle is illegal. The no-fly area may also be referred to as an illegal area.

When determining that the first flight path has no problem, the UTM node may perform S540. When determining that the first flight path has a problem, the UTM node may perform S550.

S540. The UTM node sends the information about the flight path to the first uncrewed aerial vehicle.

The UTM node may send the information about the first flight path to the first uncrewed aerial vehicle by using the access network device. After receiving the information about the first flight path, the first uncrewed aerial vehicle flies based on the information about the first flight path.

S550. The UTM node sends a second message to the uncrewed aerial vehicle controller associated with the first uncrewed aerial vehicle, where the second message is used to reject the first flight path.

In this embodiment of this application, a message used to reject the first flight path is referred to as the second message. The second message may carry different content of information elements, to reject the first flight path. For example, the second message may include a rejection indication, and the rejection indication may be, for example, a cause value indicating that there is a collision risk and/or illegality, or may be an alarm indication. For another example, the second message may indirectly indicate, by carrying information about a time point and/or a location at which there is the problem in the first flight path, to reject the first flight path. For still another example, the second message may indirectly indicate, by carrying information about an updated flight path (that is, a proposed flight path) or a time point at which there is a problem and/or location change suggestion information, to reject the first flight path. For yet another example, the second message may carry both a rejection indication and information about a time point and/or a location at which there is a problem in the first flight path, the second message may carry both a rejection indication and information about a new flight path, or the second message may carry both a rejection indication and flight path change suggestion information (a time point at which there is a problem and/or location change suggestion information).

It may be understood that the flight path change suggestion information is relative change information of the flight path. For example, adjustment is performed based on the location at which there is the problem on the first flight path. For example, the first uncrewed aerial vehicle moves upward/downward/left/right by a specific distance. Alternatively, the first uncrewed aerial vehicle adjusts, based on the current flight path, a time point corresponding to the location at which there is the problem. For example, the first uncrewed aerial vehicle may continue to fly after staying, for a specific time period, at a location at which there is no problem (so that a path of another uncrewed aerial vehicle may be staggered).

It can be learned that after determining that the first flight path has the problem, the UTM node may re-formulate a flight path, or may send the rejection indication and/or a change suggestion to the uncrewed aerial vehicle controller, so that the uncrewed aerial vehicle controller re-formulates a path for the first uncrewed aerial vehicle. After re-formulating the path, the uncrewed aerial vehicle controller may re-perform S520 and subsequent steps until the flight path is not rejected, or may notify the first uncrewed aerial vehicle of flying along a re-formulated path. It may be understood that when the UTM node re-formulates the flight path, optionally, in this embodiment of this application, the UTM node may alternatively send the information about the updated flight path to the first uncrewed aerial vehicle.

The UTM node may send the information about the updated flight path to the first uncrewed aerial vehicle by using the access network device. After receiving the information about the updated flight path, the first uncrewed aerial vehicle flies based on the information about the updated flight path.

It may be understood that the UTM node may determine the information about the updated flight path or the flight path change suggestion for the first uncrewed aerial vehicle based on information such as the size and/or the model of the first uncrewed aerial vehicle.

In this embodiment of this application, the uncrewed aerial vehicle controller reports the flight path to the UTM node, and the UTM node implements centralized management on the flight path, to ensure flight safety and legality.

Figure 6:
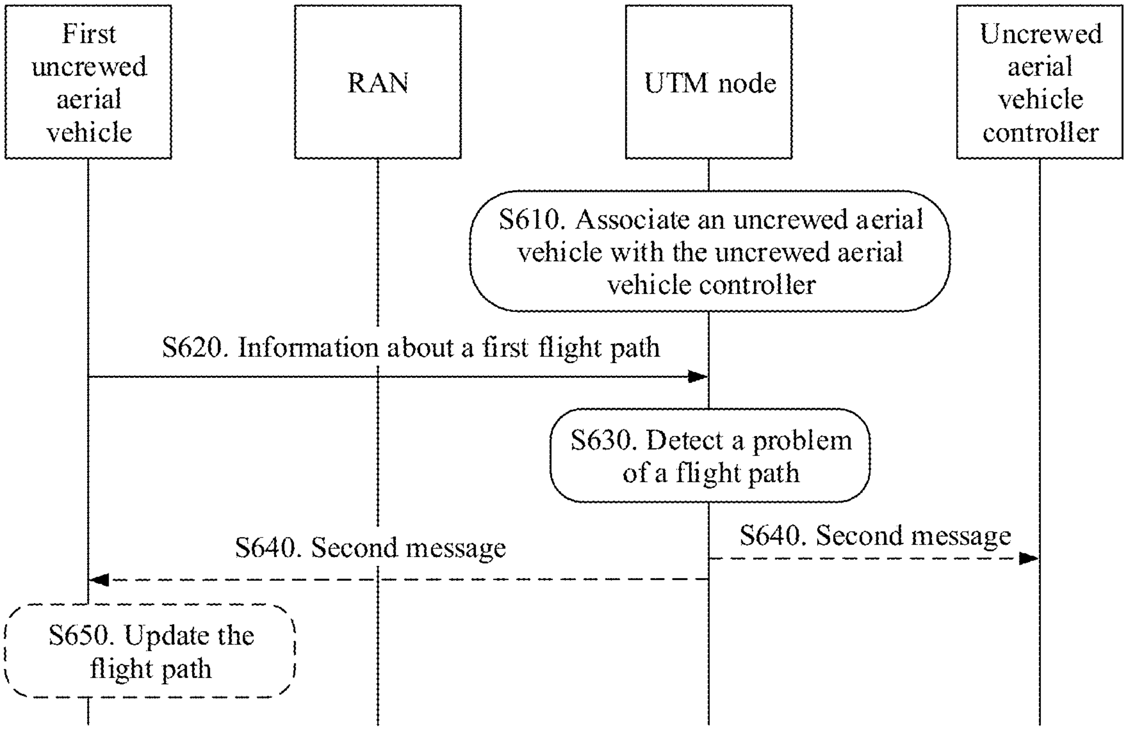
FIG. 6 is a schematic diagram of an uncrewed aerial vehicle control method according to still another embodiment of this application.

In the embodiment shown in FIG. 5, the uncrewed aerial vehicle controller sends the information about the flight path to the UTM node. It may be understood that the uncrewed aerial vehicle may alternatively send the information about the flight path to the UTM node. As shown in FIG. 6, another embodiment of this application provides an uncrewed aerial vehicle control method, including the following steps.

S610. A UTM node associates an uncrewed aerial vehicle controller with an uncrewed aerial vehicle controlled by the uncrewed aerial vehicle controller.

S610 is similar to S510. For details, refer to related descriptions in S510. Details are not described herein again.

It should be noted that S610 is an optional step, that is, S610 may be skipped.

S620. A first uncrewed aerial vehicle sends information about a first flight path to the UTM node.

Optionally, the information about the first flight path may be received by the first uncrewed aerial vehicle from a corresponding uncrewed aerial vehicle controller by using an application layer. The first uncrewed aerial vehicle may send the information about the first flight path to the UTM node by using an access network device. The access network device may transparently transmit the first flight path to the UTM node, or the access network device may read or parse the information about the first flight path.

After receiving the information about the first flight path, the UTM node may determine, based on an association relationship learned of in S610, the uncrewed aerial vehicle controller corresponding to the first uncrewed aerial vehicle. Alternatively, the UTM node may learn, based on an identifier, an index, or other indication information in the information about the first flight path, of the uncrewed aerial vehicle controller corresponding to the first uncrewed aerial vehicle.

It may be understood that the UTM node may receive information about a flight path sent by at least one uncrewed aerial vehicle. After receiving the information about the first flight path, the UTM node performs S630.

S630. The UTM node determines whether the first flight path has a problem. For how the UTM node determines whether the first flight path has the problem, refer to related descriptions in S530. Details are not described herein again.

When the UTM node determines that the first flight path has no problem, no processing is performed. In this case, the first uncrewed aerial vehicle may fly along the first flight path after receiving no feedback from the UTM node in a period of time. Alternatively, when sending the information about the first flight path, the first uncrewed aerial vehicle first flies along the first flight path, and the first uncrewed aerial vehicle adjusts the flight path after receiving rejection information from the UTM node. If the first uncrewed aerial vehicle does not receive the rejection information of the UTM node, the first uncrewed aerial vehicle keeps flying along the first flight path.

Alternatively, when determining that the first flight path has no problem, the UTM node may send an acknowledgment response to the first uncrewed aerial vehicle, so that the first uncrewed aerial vehicle learns that the first flight path has no problem, and flies along the first flight path.

When the UTM node determines that the first flight path has the problem, S640 may be performed.

S640. The UTM node sends a second message, where the second message is used to reject the first flight path.

The UTM node may send the second message to the first uncrewed aerial vehicle, and the first uncrewed aerial vehicle may update the flight path based on the second message. For related descriptions of content and a function of the second message, refer to related descriptions in S550. A difference lies in that the second message in S550 is sent to the uncrewed aerial vehicle controller, and the second message herein is sent to the first uncrewed aerial vehicle. It may be understood that the UTM node may send the second message to the first uncrewed aerial vehicle by using the access network device. After receiving the second message, the first uncrewed aerial vehicle may perform S650. Optionally, in addition to sending the second message to the first uncrewed aerial vehicle, the UTM node may further send the second message to the uncrewed aerial vehicle controller corresponding to the first uncrewed aerial vehicle. It may be understood that the "second message" herein indicates that content or a function is similar to that of the "second message" in the embodiment shown in FIG. 5, and does not indicate that message names in the two procedures in FIG. 5 and FIG. 6 are definitely the same. In other words, the message names or carriers in the two procedures may be different or the same.

Alternatively, the UTM node may send the second message to the uncrewed aerial vehicle controller corresponding to the first uncrewed aerial vehicle. In this case, after receiving the second message, the uncrewed aerial vehicle controller may re-formulate a flight path for the first uncrewed aerial vehicle, so that S620 and subsequent steps may be further performed again, or the first uncrewed aerial vehicle flies along the flight path re-formulated by the uncrewed aerial vehicle controller.

S650. The first uncrewed aerial vehicle updates the flight path, and flies along an updated flight path.

The first uncrewed aerial vehicle updates the flight path in different manners based on different content in the second message.

For example, when the second message includes a rejection indication, the first uncrewed aerial vehicle may request a corresponding uncrewed aerial vehicle controller to update the flight path, and fly along an updated path of the uncrewed aerial vehicle controller; the first uncrewed aerial vehicle directly adjusts an entire flight path upward/downward/left/right by a distance; or the first uncrewed aerial vehicle modifies time of flight. For another example, when the second message includes time point and/or location information at which there is the problem in the first flight path, the first uncrewed aerial vehicle may update the flight path based on the time point and/or location information at which there is the problem, and fly along the updated flight path. It may be understood that, for a case in which the uncrewed aerial vehicle controller or the uncrewed aerial vehicle determines the updated flight path, the uncrewed aerial vehicle controller or the uncrewed aerial vehicle may fly along the updated flight path after determining the updated flight path, or S620 and subsequent steps may be further performed again until the flight path is not rejected.

For still another example, when the second message includes information about the updated flight path, the first uncrewed aerial vehicle flies along the updated flight path.

In this embodiment of this application, the uncrewed aerial vehicle reports the flight path to the UTM node, and the UTM node implements centralized management on the flight path, to ensure flight safety and legality.

Figure 7:
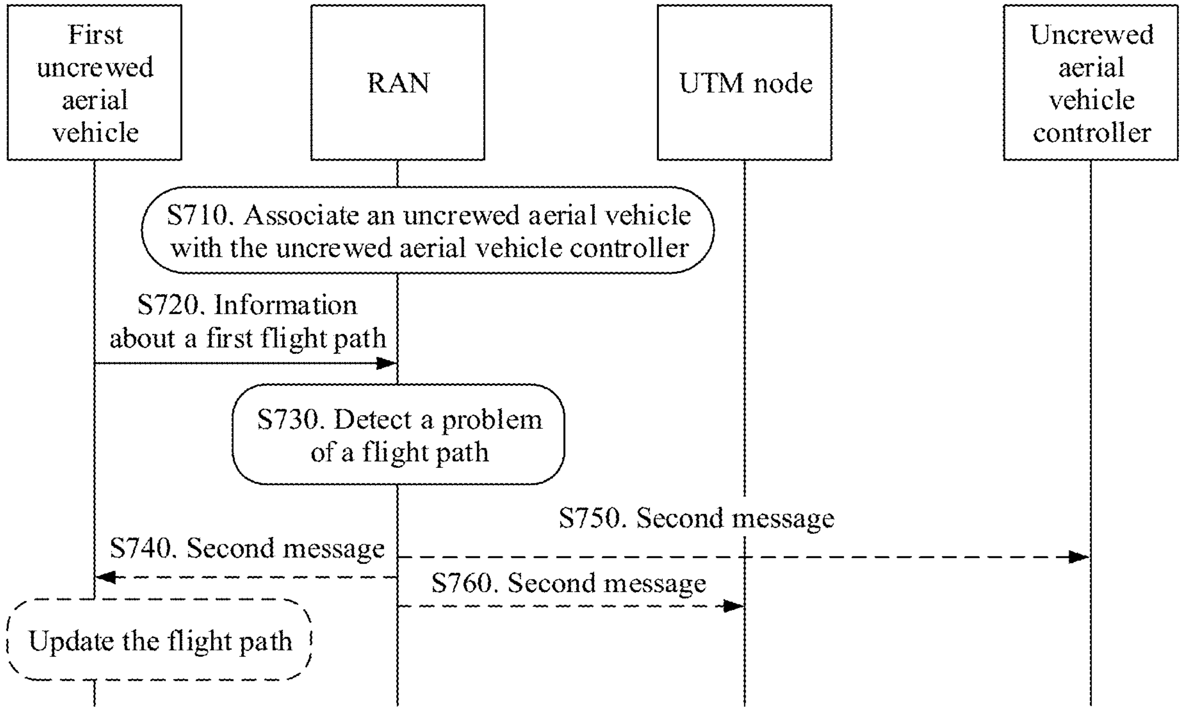
FIG. 7 is a schematic diagram of an uncrewed aerial vehicle control method according to an embodiment of this application.

In addition to implementing centralized management on the flight path, the UTM node may also implement centralized management on the flight path on an access network device side. As shown in FIG. 7, still another embodiment of this application provides an uncrewed aerial vehicle control method, including the following steps.

S710. An access network device associates an uncrewed aerial vehicle controller with an uncrewed aerial vehicle controlled by the uncrewed aerial vehicle controller.

A method for associating, by the access network device, the uncrewed aerial vehicle controller with the uncrewed aerial vehicle controlled by the uncrewed aerial vehicle controller is similar to a method for associating, by a UTM node, the uncrewed aerial vehicle controller with the uncrewed aerial vehicle controlled by the uncrewed aerial vehicle controller. For details, refer to related descriptions in S510. Details are not described herein again.

It should be noted that S710 is an optional step, that is, S710 may be skipped.

S720. A first uncrewed aerial vehicle or an uncrewed aerial vehicle controller corresponding to the first uncrewed aerial vehicle sends information about a first flight path to the access network device.

The access network device may learn of the information about the first flight path by receiving the information about the first flight path sent by the first uncrewed aerial vehicle or the uncrewed aerial vehicle controller corresponding to the first uncrewed aerial vehicle.

If the first flight path is sent by the uncrewed aerial vehicle controller, the access network device may determine, based on an association relationship learned of in S710, that the flight path is formulated for the first uncrewed aerial vehicle. Alternatively, the access network device may learn, based on an identifier, an index, or other indication information in the information about the first flight path, that the flight path is formulated for the first uncrewed aerial vehicle.

If the first flight path is sent by the first uncrewed aerial vehicle, the access network device may determine, based on an association relationship learned of in S710, a corresponding uncrewed aerial vehicle controller. Alternatively, the access network device may learn of a corresponding uncrewed aerial vehicle controller based on an identifier, an index, or other indication information in information about the flight path.

S730. The access network device determines whether the first flight path has a problem.

It may be understood that a method for determining, by the access network device, whether the first flight path has the problem is similar to a method for determining, by the UTM node, whether the first flight path has the problem. Therefore, refer to related descriptions in S530. Details are not described herein again.

When the access network device determines that the first flight path has no problem, the first uncrewed aerial vehicle may fly along the first flight path. For example, the access network device sends, to the first uncrewed aerial vehicle, the information that is about the first flight path and that is sent by the uncrewed aerial vehicle controller. For another example, when the first uncrewed aerial vehicle has learned of the information about the first flight path, the first uncrewed aerial vehicle may fly along the first flight path after receiving no feedback from the access network device in a period of time. Alternatively, when sending the information about the first flight path, the first uncrewed aerial vehicle first flies along the first flight path, and the first uncrewed aerial vehicle adjusts the flight path after receiving rejection information from the access network device. If the first uncrewed aerial vehicle does not receive the rejection information of the UTM node, the first uncrewed aerial vehicle keeps flying along the first flight path.

When determining that the first flight path has the problem, the access network device may perform S740, S750, or S760.

S740. The access network device sends a second message to the first uncrewed aerial vehicle.

For content and a function of the second message, refer to related descriptions in S550. Details are not described herein again. After receiving the second message, the first uncrewed aerial vehicle may update the flight path based on the second message, and fly along an updated flight path. For example, refer to related descriptions in S650. It may be understood that the "second message" herein indicates that content or a function is similar to that of the "second message" in the embodiment shown in FIG. 5, and does not indicate that message names in the two procedures in FIG. 5 and FIG. 7 are definitely the same. In other words, the message names or carriers in the two procedures may be different or the same.

S750. The access network device sends the second message to the uncrewed aerial vehicle controller corresponding to the first uncrewed aerial vehicle.

For the second message, refer to the related descriptions in S550. Details are not described herein again. After receiving the second message, the uncrewed aerial vehicle controller corresponding to the first uncrewed aerial vehicle may re-formulate a flight path based on the second message. For example, refer to the related descriptions in S550. In this way, the first uncrewed aerial vehicle flies along the re-formulated flight path.

S760. The access network device sends the second message to the UTM node.

For the second message, refer to the related descriptions in S550. Details are not described herein again.

In a possible implementation, after receiving the second message, the UTM node may forward the second message to the uncrewed aerial vehicle controller corresponding to the first uncrewed aerial vehicle, and then the uncrewed aerial vehicle controller may re-formulate a flight path based on the second message. For example, refer to the related descriptions in S550. In this way, the first uncrewed aerial vehicle flies along the re-formulated flight path.

In another possible implementation, after receiving the second message, the UTM node may perform related processing based on the second message, for example, re-formulate a flight path, and send the re-formulated path to the uncrewed aerial vehicle controller corresponding to the first uncrewed aerial vehicle or send the re-formulated path to the first uncrewed aerial vehicle, so that the first uncrewed aerial vehicle flies along the re-formulated flight path. In other words, the access network device may identify the problem, and the UTM node may plan the flight path.

In this embodiment of this application, the flight path is reported to the access network device, and the access network device identifies the flight path, to further manage the flight path and ensure flight safety and legality.

It should be noted that a name or a carrier of the second message in the foregoing embodiments is not limited in this application.

It should be noted that the embodiment shown in FIG. 4 may be further combined with any embodiment shown in FIG. 5 to FIG. 7. That is, both the uncrewed aerial vehicle and the network device manage and control the flight path. For example, the network device may determine, based on the method in any embodiment shown in FIG. 5 to FIG. 7, whether the flight path of the uncrewed aerial vehicle is legal. The uncrewed aerial vehicle determines, based on the method shown in FIG. 4, whether a collision occurs, to adjust the flight path based on the information. For another example, the uncrewed aerial vehicle may receive information about flight paths of only some uncrewed aerial vehicles, and the uncrewed aerial vehicle cannot comprehensively determine whether a collision occurs. In this case, the uncrewed aerial vehicle may control the flight path based on identification and update information of the flight path of the network device.

Sequence numbers of the foregoing processes do not mean execution sequences in the foregoing method embodiments. The execution sequences of the processes should be determined based on functions and internal logic of the processes, and should not be construed as any limitation on the implementation processes of embodiments of this application. In addition, it is possible that not all operations in the foregoing method embodiments need to be performed.

It should be understood that the uncrewed aerial vehicle, the uncrewed aerial vehicle controller, and the network device in the foregoing method embodiments may perform some or all of the steps in the embodiments. These steps or operations are merely examples. Other operations or variations of various operations may be further performed in embodiments of this application. In addition, "first", "second", and various numeric numbers in embodiments of this application are merely used for distinguishing for ease of descriptions, and are not used to limit the scope of embodiments of this application. For example, different frequencies are distinguished. In addition, the "protocol" involved in embodiments of this application may be a standard protocol in the communication field, for example, may include an LTE protocol, an NR protocol, and a related protocol applied to a future communication system. This is not limited in this application.

It may be understood that in the foregoing embodiments, the operations or steps implemented by the uncrewed aerial vehicle may be implemented by a component (for example, a chip or a circuit) that can be configured in the uncrewed aerial vehicle, operations or steps implemented by the uncrewed aerial vehicle controller may alternatively be implemented by a component (for example, a chip or a circuit) that can be configured in the uncrewed aerial vehicle controller, the operations or steps implemented by the UTM node may alternatively be implemented by a component (for example, a chip or a circuit) that can be configured in the UTM node, and the operations or steps implemented by the access network device may alternatively be implemented by a component (for example, a chip or a circuit) that can be configured in the access network device. An embodiment of this application further provides a communication apparatus. The communication apparatus is configured to correspondingly implement the method in the foregoing embodiment. It should be understood that, descriptions of the apparatus embodiments correspond to the descriptions of the method embodiments. Therefore, for content that is not described in detail, refer to the foregoing method embodiments. For brevity, some content is not described herein.

Figure 8:
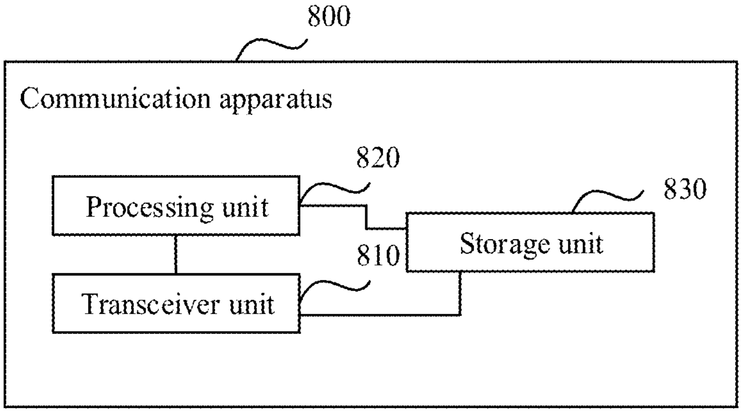
FIG. 8 is a schematic diagram of a communication apparatus according to an embodiment of this application.

As shown in FIG. 8, a communication apparatus 800 may include at least one transceiver unit 810 and at least one processing unit 820. Optionally, the communication apparatus may further include at least one storage unit 830. The storage unit 830 may be coupled to the transceiver unit 810 and/or the processing unit 820. For example, the storage unit 830 may be configured to store other information such as computer-executable instructions and/or data. The processing unit 820 may read the instructions or the data stored in the storage unit 830, to implement a corresponding solution.

It should be noted that the transceiver unit 810 in this embodiment of this application may also be referred to as a communication unit (module) or a communication interface, and the processing unit 820 may be referred to as a processing module or a processor. The storage unit 830 may also be referred to as a storage module or a memory.

The communication apparatus 800 may separately implement operations or steps corresponding to an uncrewed aerial vehicle, an uncrewed aerial vehicle controller, a UTM node, and an access network device in any method embodiment in FIG. 4 to FIG. 7.

For example, when the communication apparatus 800 implements the operations or steps corresponding to the uncrewed aerial vehicle in the foregoing method embodiments, the communication apparatus 800 may be the uncrewed aerial vehicle, or may be a component (a chip or a circuit) that may be used in the uncrewed aerial vehicle.

For example, when the communication apparatus 800 implements the operations or steps corresponding to the uncrewed aerial vehicle controller in the foregoing method embodiments, the communication apparatus 800 may be the uncrewed aerial vehicle controller, or may be a component (a chip or a circuit) that may be used in the uncrewed aerial vehicle controller.

For example, when the communication apparatus 800 implements the operations or steps corresponding to the UTM node in the foregoing method embodiments, the communication apparatus 800 may be the UTM node, or may be a component (a chip or a circuit) that may be used in the UTM node.

For example, when the communication apparatus 800 implements the operations or steps corresponding to the access network device in the foregoing method embodiments, the communication apparatus 800 may be the access network device, or may be a component (a chip or a circuit) that may be used in the access network device.

In a possible implementation, when the communication apparatus 800 implements the operations or steps corresponding to the uncrewed aerial vehicle in the method embodiment shown in FIG. 4, the transceiver unit 810 is configured to receive information about a flight path from a second uncrewed aerial vehicle. The processing unit 820 is configured to: determine, based on information about a flight path of the processing unit 820 and the information about the flight path received from the second uncrewed aerial vehicle, that there is a collision risk, and update the flight path of the processing unit 820. Optionally, the transceiver unit 810 may receive the information about the flight path from the second uncrewed aerial vehicle through a sidelink. Optionally, the processing unit 820 may determine, based on one or more of the foregoing conditions (1) to (4), whether there is the collision risk. Optionally, the transceiver unit 810 may further receive one or more of a first threshold to a third threshold. Optionally, the transceiver unit 810 may be further configured to: report collision risk information, and receive information used to indicate to update the flight path.

In a possible implementation, when the communication apparatus 800 implements the operations or steps corresponding to the uncrewed aerial vehicle or the uncrewed aerial vehicle controller in any one of the method embodiments shown in FIG. 5 to FIG. 7, the transceiver unit 810 is configured to receive a second message used to reject a flight path. The processing unit 820 is configured to update the flight path based on the second message, so that the uncrewed aerial vehicle flies along the updated flight path.

In a possible implementation manner, when the communication apparatus 800 implements the operations or steps corresponding to the uncrewed aerial vehicle controller, the UTM node, or the access network device in the method embodiment shown in FIG. 4, the transceiver unit 810 is configured to receive collision risk information reported by the uncrewed aerial vehicle. The processing unit 820 learns that there is a collision risk. In this case, the transceiver unit 810 is further configured to send flight path update information to the uncrewed aerial vehicle.

In a possible implementation, when the communication apparatus 800 is configured to implement the operations or steps corresponding to the UTM node in any one of the method embodiments shown in FIG. 5 or FIG. 6, the transceiver unit 810 is configured to receive information about a first flight path of the uncrewed aerial vehicle. The processing unit 820 is configured to determine whether the first flight path has a problem. If the first flight path has the problem, the transceiver unit 810 is configured to send a second message, where the second message is used to reject the first flight path. Optionally, the processing unit 820 may be further configured to associate the uncrewed aerial vehicle with an uncrewed aerial vehicle controller corresponding to the uncrewed aerial vehicle. The transceiver unit 810 may receive the information about the first flight path from the uncrewed aerial vehicle controller or the uncrewed aerial vehicle, and the transceiver unit 810 may send the second message to the uncrewed aerial vehicle or the uncrewed aerial vehicle controller.

In a possible implementation, when the communication apparatus 800 is configured to implement the operations or steps corresponding to the UTM node in the method embodiments shown in FIG. 7, the transceiver unit 810 is configured to receive information about a first flight path of the uncrewed aerial vehicle. The processing unit 820 is configured to determine whether the first flight path has a problem. If the first flight path has the problem, the transceiver unit 810 is configured to send a second message, where the second message is used to reject the first flight path. Optionally, the processing unit 820 may be further configured to associate the uncrewed aerial vehicle with an uncrewed aerial vehicle controller corresponding to the uncrewed aerial vehicle. The transceiver unit 810 may receive the information about the first flight path from the uncrewed aerial vehicle controller or the uncrewed aerial vehicle, and the transceiver unit 810 may send the second message to the uncrewed aerial vehicle, the uncrewed aerial vehicle controller, or the UTM node.

The communication apparatus in this embodiment of this application manages the flight path of the uncrewed aerial vehicle, to ensure flight safety.

It may be understood that the foregoing units may be separately disposed or may be integrated. This is not limited in this embodiment of this application.

The "module" or the "unit" in embodiments of this application may be an application-specific integrated circuit ASIC, a circuit, a processor and a memory that executes one or more software or firmware programs, an integrated logic circuit, and/or another component that can provide the foregoing functions.

Figure 9:
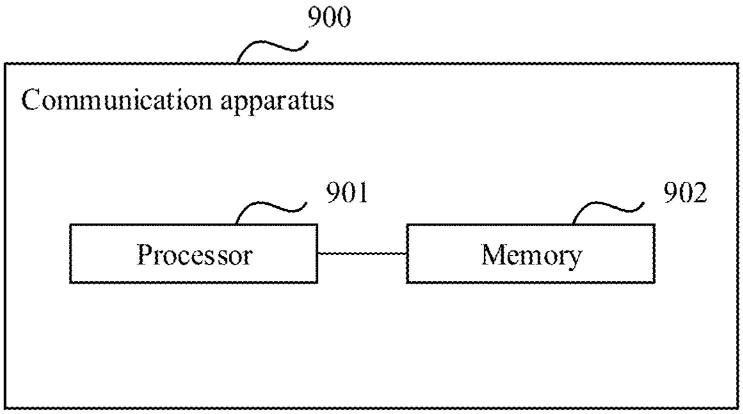
FIG. 9 is a schematic diagram of a communication apparatus according to another embodiment of this application.

FIG. 9 shows a communication apparatus 900 according to another embodiment of this application. The communication apparatus 900 may implement any function corresponding to the uncrewed aerial vehicle, the uncrewed aerial vehicle controller, the UTM node, or the access network device in each of the foregoing method embodiments. The communication apparatus 900 includes at least one processor 901 (that one processor is included is used as an example for description in FIG. 9) and at least one memory 902 (that one memory is included is used as an example for description in FIG. 9). The memory may store instructions (or may also be referred to as programs or code) and/or data. The processor 901 is coupled to the memory 902. For example, the processor 901 may invoke the instructions and/or the data in the memory 902, so that the communication apparatus separately implements any operation or step corresponding to the uncrewed aerial vehicle, the uncrewed aerial vehicle controller, the UTM node, or the access network device in the foregoing method embodiments.

The processor and the transceiver described in embodiments of this application may be implemented on an integrated circuit (IC), an analog IC, a radio frequency integrated circuit RFIC, a hybrid signal IC, an application-specific integrated circuit (ASIC), a printed circuit board (PCB), an electronic device, or the like. The processor and the transceiver may also be manufactured by using various 1C technologies, for example, a complementary metal oxide semiconductor (CMOS), an N-type metal oxide semiconductor (NMOS), a P-type metal oxide semiconductor (PMOS), a bipolar junction transistor (BJT), a bipolar CMOS (BiCMOS), silicon germanium (SiGe), and gallium arsenide (GaAs). Optionally, the processor may include one or more processors. For example, the processor may include one or more CPUs. When the processor is one CPU, the CPU may be a single-core CPU or a multi-core CPU. The transceiver is configured to: send data and/or a signal, and receive data and/or a signal. The transceiver may include a transmitter and a receiver. The transmitter is configured to send data and/or a signal, and the receiver is configured to receive data and/or a signal. The transceiver may also be a communication interface. The memory includes but is not limited to a random access memory (RAM), a read-only memory (ROM), an erasable programmable read-only memory (EPROM), or a compact disc read-only memory (CD-ROM). The memory is configured to store related instructions and/or data.

In a possible design, the chip mentioned in embodiments of this application may implement a related function that can be implemented by the processor, may implement a related function that can be implemented by the processor and the transceiver, or may implement a related function that can be implemented by the processor, the transceiver, and the memory. The chip may be a field programmable gate array, a dedicated integrated chip, a system chip, a central processing unit, a digital signal processing circuit, or a microcontroller for implementing a related function, or may be a programmable controller or another integrated chip.

An embodiment of this application further provides a computer-readable medium. The computer-readable medium stores a computer program. When the computer program is executed, the communication method in any one of the foregoing method embodiments is implemented.

An embodiment of this application further provides a computer program product. When the computer program product is executed, the communication method in any one of the foregoing method embodiments is implemented.

This application further provides a communication system. The communication system may include an uncrewed aerial vehicle, and may further include one or more of an uncrewed aerial vehicle controller, a UTM node, and an access network device.

It may be clearly understood by a person skilled in the art that, for a purpose of convenient and brief descriptions, for a detailed working process of the foregoing described system, apparatus, and unit, refer to a corresponding process in the foregoing method embodiments. Details are not described herein.

A person of ordinary skill in the art may be aware that, units and algorithm steps in examples described with reference to embodiments disclosed in this specification can be implemented by electronic hardware or a combination of computer software and electronic hardware. Whether functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for a purpose of convenient and brief descriptions, for a detailed working process of the foregoing system, apparatus, and unit, refer to a corresponding process in the foregoing method embodiments. Details are not described herein.

In the several embodiments provided in this application, it should be understood that the disclosed system, the apparatus, and the method may be implemented in other manners. For example, the described apparatus embodiments are merely examples. For example, division into the units is merely logical function division. During actual implementation, there may be another division manner. For example, a plurality of units or components may be combined or integrated into another system, or some features may be ignored or not performed. In addition, the displayed or discussed mutual couplings or direct couplings or communication connections may be implemented through some interfaces, and the indirect couplings or communication connections between apparatuses or units may be implemented in an electronic form, a mechanical form, or another form.

Units described as separate components may or may not be physically separated, and components displayed as units may or may not be physical units. That is, the units may be located at one location, or may be distributed to a plurality of network units. Some or all of the units may be selected based on an actual requirement to implement the objectives of the solutions of the embodiments.

In addition, function units in embodiments of this application may be integrated into one processing unit, or each of the units may exist alone physically, or two or more units may be integrated into one unit.

All or some of the foregoing embodiments may be implemented by software, hardware, firmware, or any combination thereof. When the software is used to implement the embodiments, all or some of the embodiments may be implemented in a form of a computer program product. The computer program product includes one or more computer instructions. When the computer program instructions are loaded and executed on a computer, the procedures or the functions according to the embodiments of the present invention are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, a computer, a server, or a data center to another website, computer, server, or data center in a wired (for example, a coaxial cable, an optical fiber, or a digital subscriber line (DSL)) or wireless (for example, infrared, radio, and microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid state drive Solid State Drive (SSD)), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An uncrewed aerial vehicle control method comprising:
- receiving, by a first uncrewed aerial vehicle, information about a flight path from a second uncrewed aerial vehicle, wherein the second uncrewed aerial vehicle is at least one uncrewed aerial vehicle different from the first uncrewed aerial vehicle;
- determining, by the first uncrewed aerial vehicle, that there is a collision risk, based on information about a flight path of the first uncrewed aerial vehicle and the information about the flight path received from the second uncrewed aerial vehicle;
- updating, by the first uncrewed aerial vehicle, the flight path of the first uncrewed aerial vehicle based on flight path update information received from a network device;
- determining that there is the collision risk in response to at least one of the following conditions:
  - the flight path of the first uncrewed aerial vehicle and the flight path of another uncrewed aerial vehicle appear at a same location at two close moments, or
  - a spacing between a corresponding location of the flight path of the first uncrewed aerial vehicle and a corresponding location of the flight path of another uncrewed aerial vehicle at two close moments is less than or equal to a second threshold; and
- wherein the two close moments occur based on an absolute value of a difference between the two close moments being less than or equal to a third threshold.

2. The method according to claim 1, further comprising:
- receiving, by the first uncrewed aerial vehicle, a layer 2 identifier identifying a function or a purpose of the information about the flight path from the second uncrewed aerial vehicle through a sidelink.

3. The method according to claim 1, wherein the updating, by the first uncrewed aerial vehicle, the flight path of the first uncrewed aerial vehicle comprises:
- actively updating, by the first uncrewed aerial vehicle, a current flight path, and sending information related to an updated flight path to the network device, wherein the network device is an uncrewed aerial system traffic management node or a radio access network device.

4. The method according to claim 1, wherein after determining that there is a collision risk, the method further comprises: reporting, by the first uncrewed aerial vehicle, collision risk information; and
- wherein the updating, by the first uncrewed aerial vehicle, the flight path of the first uncrewed aerial vehicle comprises: receiving, by the first uncrewed aerial vehicle, the flight path update information, and updating a current flight path based on the flight path update information.

5. The method according to claim 1, wherein it is determined there is a collision risk in response to at least one of the following conditions:
- a location of the flight path of the first uncrewed aerial vehicle overlaps a location of the flight path of another uncrewed aerial vehicle at a same moment, or
- a spacing between a location of the flight path of the first uncrewed aerial vehicle and a location of the flight path of another uncrewed aerial vehicle at a same moment is less than or equal to a first threshold.

6. The method according to claim 1, wherein the updating the flight path of the first uncrewed aerial vehicle comprises adjusting a time point corresponding to an alarm location related to a current flight path, wherein the alarm location is related to the collision risk.

7. A communication apparatus applied in a first uncrewed aerial vehicle, wherein the apparatus comprises a processor and a memory, wherein the memory is configured to store a program to be executed by the processor, the program including instructions for:
- receiving, information about a flight path from a second uncrewed aerial vehicle, wherein the second uncrewed aerial vehicle is at least one uncrewed aerial vehicle different from the first uncrewed aerial vehicle;
- determining based on information about a flight path of the first uncrewed aerial vehicle and the information about the flight path received from the second uncrewed aerial vehicle, that there is a collision risk;
- updating the flight path of the first uncrewed aerial vehicle based on flight path update information received from a network device;
- determining that there is the collision risk in response to at least one of the following conditions:
  - the flight path of the first uncrewed aerial vehicle and the flight path of another uncrewed aerial vehicle appear at a same location at two close moments, or
  - a spacing between a corresponding location of the flight path of the first uncrewed aerial vehicle and a corresponding location of the flight path of another uncrewed aerial vehicle at two close moments is less than or equal to a second threshold; and
- wherein the two close moments occur based on an absolute value of a difference between the two close moments being less than or equal to a third threshold.

8. The apparatus according to claim 7, wherein the program further includes instructions for:

receiving the information about the flight path and a layer 2 identifier which identifies a function or a purpose of the information about the flight path from the second uncrewed aerial vehicle through a sidelink.

9. The apparatus according to claim 7, wherein the program further includes instructions for:

actively updating a current flight path, and sending information related to an updated flight path to the network device, wherein the network device is an uncrewed aerial system traffic management node or a radio access network device.

10. The apparatus according to claim 7, wherein the program further includes instructions for:

reporting, by the first uncrewed aerial vehicle, collision risk information; and wherein the updating the flight path of the first uncrewed aerial vehicle comprises: receiving, by the first uncrewed aerial vehicle, the flight path update information, and updating a current flight path based on the flight path update information.

11. The apparatus according to claim 7, wherein it is determined there is a collision risk in response to at least one of the following conditions:

a location of the flight path of the first uncrewed aerial vehicle overlaps a location of the flight path of another uncrewed aerial vehicle at a same moment, or a spacing between a location of the flight path of the first uncrewed aerial vehicle and a location of the flight path of another uncrewed aerial vehicle at a same moment is less than or equal to a first threshold.

12. The apparatus according to claim 7, wherein the updating the flight path of the first uncrewed aerial vehicle comprises adjusting a time point corresponding to an alarm location related to a current flight path, wherein the alarm location is related to the collision risk.

13. A non-transitory machine readable storage medium having stored thereon processor executable instructions which, when executed by a processor, cause the processor to control an uncrewed aerial vehicle to perform a method comprising:

receiving, by a first uncrewed aerial vehicle, information about a flight path from a second uncrewed aerial vehicle, wherein the second uncrewed aerial vehicle is at least one uncrewed aerial vehicle different from the first uncrewed aerial vehicle;

determining, by the first uncrewed aerial vehicle, that there is a collision risk, based on information about a flight path of the first uncrewed aerial vehicle and the information about the flight path received from the second uncrewed aerial vehicle;

updating, by the first uncrewed aerial vehicle, the flight path of the first uncrewed aerial vehicle based on flight path update information received from a network device;

determining that there is a collision risk in response to at least one of the following conditions:

the flight path of the first uncrewed aerial vehicle and the flight path of another uncrewed aerial vehicle appear at a same location at two close moments, or a spacing between a corresponding location of the flight path of the first uncrewed aerial vehicle and a corresponding location of the flight path of another uncrewed aerial vehicle at two close moments is less than or equal to a second threshold; and wherein the two close moments occur based on an absolute value of a difference between the two close moments being less than or equal to a third threshold.

14. The non-transitory machine readable storage medium according to claim 13, further comprising:

receiving, by the first uncrewed aerial vehicle, a layer 2 identifier identifying a function or a purpose of the information about the flight path from the second uncrewed aerial vehicle through a sidelink.

15. The non-transitory machine readable storage medium according to claim 13, wherein the updating, by the first uncrewed aerial vehicle, the flight path of the first uncrewed aerial vehicle comprises:

actively updating, by the first uncrewed aerial vehicle, a current flight path, and sending information related to an updated flight path to the network device, wherein the network device is an uncrewed aerial system traffic management node or a radio access network device.

16. The non-transitory machine readable storage medium according to claim 13, wherein after determining that there is a collision risk, the method further comprises: reporting, by the first uncrewed aerial vehicle, collision risk information; and wherein the updating, by the first uncrewed aerial vehicle, the flight path of the first uncrewed aerial vehicle comprises: receiving, by the first uncrewed aerial vehicle, the flight path update information, and updating a current flight path based on the flight path update information.

17. The non-transitory machine readable storage medium according to claim 13, wherein it is determined there is a collision risk in response to at least one of the following conditions:

a location of the flight path of the first uncrewed aerial vehicle overlaps a location of the flight path of another uncrewed aerial vehicle at a same moment, or a spacing between a location of the flight path of the first uncrewed aerial vehicle and a location of the flight path of another uncrewed aerial vehicle at a same moment is less than or equal to a first threshold.

18. The non-transitory machine readable storage medium according to claim 13, further comprising:

determining there is no collision risk.

19. The non-transitory machine readable storage medium according to claim 13, wherein the conditions are configured by a network device.

20. The non-transitory machine readable storage medium according to claim 13, wherein the updating the flight path of the first uncrewed aerial vehicle comprises adjusting a time point corresponding to an alarm location related to a current flight path, wherein the alarm location is related to the collision risk.

* * * * *